(12) United States Patent
Lyszkowski et al.

(10) Patent No.: US 6,257,832 B1
(45) Date of Patent: Jul. 10, 2001

(54) MULTIPLE FAN SYSTEM HAVING MEANS FOR REDUCING BEAT FREQUENCY OSCILLATIONS

(75) Inventors: Keith Alan Lyszkowski; Douglas E. Wallace, Jr., both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/245,145

(22) Filed: Feb. 4, 1999

(51) Int. Cl.⁷ .................................................. F04B 41/06
(52) U.S. Cl. .................................. 417/2; 361/695
(58) Field of Search ........................ 417/2; 2/404, 186, 2/89; 165/87; 364/175; 700/70; 361/695

(56) References Cited

U.S. PATENT DOCUMENTS

| | | | |
|---|---|---|---|
| 4,124,001 | * 11/1978 | Samuel et al. | 123/41.12 |
| 4,425,766 | * 1/1984 | Claypole | 62/133 |
| 4,856,078 | * 8/1989 | Konopka | 388/831 |
| 5,136,465 | 8/1992 | Benck et al. . | |
| 5,168,424 | 12/1992 | Bolton et al. . | |
| 5,249,741 | * 10/1993 | Bistline et al. | 236/49.3 |
| 5,287,244 | * 2/1994 | Hileman et al. | 361/687 |
| 5,339,214 | 8/1994 | Nelson . | |
| 5,436,827 | * 7/1995 | Gunn et al. | 364/187 |
| 5,524,556 | * 6/1996 | Rowlette et al. | 110/162 |
| 5,528,454 | 6/1996 | Niklos . | |
| 5,546,272 | 8/1996 | Moss et al. . | |
| 5,687,079 | 11/1997 | Bauer et al. . | |
| 5,778,081 | 7/1998 | Patrick . | |
| 5,790,430 | * 8/1998 | Steiert | 361/6 |
| 5,791,869 | 8/1998 | Lee . | |
| 5,806,440 | * 9/1998 | Rowlette et al. | 110/162 |
| 5,825,972 | * 10/1998 | Brown | 388/811 |
| 5,963,887 | * 10/1999 | Giorgio | 702/64 |
| 6,010,310 | * 1/2000 | MacBeth | 417/44.1 |
| 6,029,119 | * 2/2000 | Atkinson | 702/132 |
| 6,040,668 | * 3/2000 | Huynh et al. | 318/471 |

* cited by examiner

*Primary Examiner*—Teresa Walberg
*Assistant Examiner*—Daniel Robinson
(74) *Attorney, Agent, or Firm*—Haynes & Boone, L.L.P.

(57) ABSTRACT

A multiple fan system including at least two simultaneously operated fans. Each of the fans are operable as a constant speed fan and as an oscillating speed fan. Not more than one of the fans is operated as a constant speed fan. Each fan not being operated as a constant speed fan is operated as an oscillating speed fan. A fan controller operates each oscillating speed fan in a mode whereby a respective acoustic emission having a range of frequency different than any other oscillating speed fans is produced.

7 Claims, 4 Drawing Sheets

MULTIPLE FAN SYSTEM HAVING MEANS FOR REDUCING BEAT FREQUENCY OSCILLATIONS

BACKGROUND

The disclosures herein relate generally to multiple fan systems. More particularly, the disclosures herein relate to multiple fan ventilating systems for computers.

In a multiple fan ventilating system, two or more fans running at the same voltage will operate at slightly different revolutions per minute (RPM). The difference in the RPM may be due to conditions such as manufacturing tolerances or the use of two different brands of fans. Regardless of the reason for the difference in the RPM, it will result in an oscillating noise known as a 'beat'. The beat occurs when the waveforms associated with the different fan frequencies interact and the waveforms add their amplitudes. An oscillation occurs between the various waveforms where they reinforce each other and then cancel each other. With high frequency devices such as ventilation fans used in computers, this interaction often appears as a background noise in the audio spectrum.

Some countries have instituted acoustical standards that place limits on the magnitude of acoustic noises such as beat frequency oscillations. Two examples of such standards are ISO 7779 and ISO 3745. Both specifications state that 'impulsive noises' must be minimized. Beats are a particularly noticeable part of this impulsive noise. The objective of such standardization is to ensure that the acoustical noise does not adversely affect workplace productivity and comfort. Additionally, in instances where a computer is used to capture and process audio information with a microphone, noise associated with a beat frequency may adversely affect performance.

U.S. Pat. No. 5,136,465 to Benck et al. discloses a personal computer in which provisions are made for effectively cooling components capable of generating heat during operation. The personal computer has an enclosure for enclosing operating components and a printed circuit board mounted within the enclosure for supporting and interconnecting the operating components. A first fan for inducing air flow into the enclosure and a second fan for expelling air from the enclosure are located within the enclosure. An air flow baffle directs the air flow through the enclosure to pass over and cool the heat generating components. No technique or components for reducing induced noise in a multiple fan system is disclosed.

U.S. Pat. No. 5,791,869 to Lee discloses a noise killing system in which a micro-electro mechanical system is mounted on the body of a fan blade. The micro-electro mechanical system includes at least one thin silicon film forming an integrated circuit and an actuator connected to the circuit for generating vibrations. To kill noise, the activator generates vibrations which offset (reduce) unstable air along the fan blade. A system or method for oscillating the speed of a fan is not disclosed. Furthermore, this reference does not disclose a multiple fan system.

U.S. Pat. No. 5,546,272 to Moss et al discloses a cooling subsystem and method for a chassis of a computer. The cooling system comprises: (1) first and second cooling fans having first and second motors associated therewith for driving the respective fans and (2) a common plenum substantially shrouded and providing a pathway for air communication between the first and second fans. The first and second fans cooperate to provide an optimum rate of air flow within the chassis. The reference does not disclose a system for oscillating the speed of a fan.

U.S. Pat. No. 5,778,081 to Patrick discloses an active noise control system including sensors which detect noise and provide electronic signals to an active noise control controller. The controller provides electronic anti-noise signals to a speaker which is connected to, and provides acoustic anti-noise into, a plurality of active resonators. The resonators are disposed successively along the propagation direction of the noise and provide time-delayed anti-noise acoustic output signals, each of which attenuates a portion of the noise. This noise control system does not disclose a multiple fan system or means for oscillating the speed of fans. Furthermore, the complexity of this system indicates that it is not a cost-effective solution for cost sensitive applications.

Accordingly, a need has arisen for a multiple fan system in which the shortcomings of the previous techniques are overcome. More particularly, a need has arisen for a multiple fan ventilating system for a computer in which a simple, cost-effective means is provided for minimizing or eliminating noise associated with the beat frequency oscillations of two or more fans operating at different fixed speeds.

SUMMARY

One embodiment, accordingly, provides a simple cost-effective method for varying the speed of at least one fan in a multiple fan ventilating system. To this end, a multi-fan system includes at least two simultaneously operated fans. Each of the fans is capable of being operated as a constant speed fan and as an oscillating speed fan. Not more than one of the fans is operated as a constant speed fan. Each fan not being operated as a constant speed fan, is operated as an oscillating speed fan.

A fan controller operates each of the oscillating speed fans within a different range of speed from each other oscillating fan.

A principal advantage of this embodiment is that by operating all of the fans or all but one of the fans in a multiple fan system at an oscillating speed, the induced acoustic noise associated with the beat frequency is dispersed over the time domain allowing systems to pass standardized acoustical specifications.

BRIEF DESCRIPTION OF THE DRAWING FIGURES

DETAILED DESCRIPTION

Figure 1:
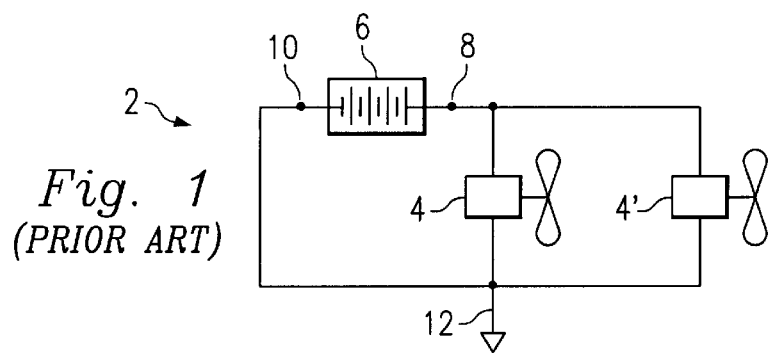
FIG. 1 is a conceptual illustration of a dual fan system having two constant speed fans.

FIG. 1 illustrates a multiple fan system, indicated generally at 2, constructed according to prior art techniques. As shown, a constant speed fan 4 and a secondary constant speed fan 4' are operated at the same DC voltage. Both fans are connected to a positive terminal 8 and to a ground location 12 that is coupled to the ground terminal of a DC power source 6. The power source 6 may be a battery, an AC-operated DC power supply, or other means for providing DC power to the fans.

Due to slight variations in manufacturing tolerance, lubrication, thermal expansion, and other conditions, the two fans will operate at slightly different fixed speeds even though both fans may be made to the same specification by the same manufacturer. With this being the case, the frequency waveforms shown in FIG. 2 will be generated. As a note, the period of a waveform is the inverse of the frequency.

Figure 2:
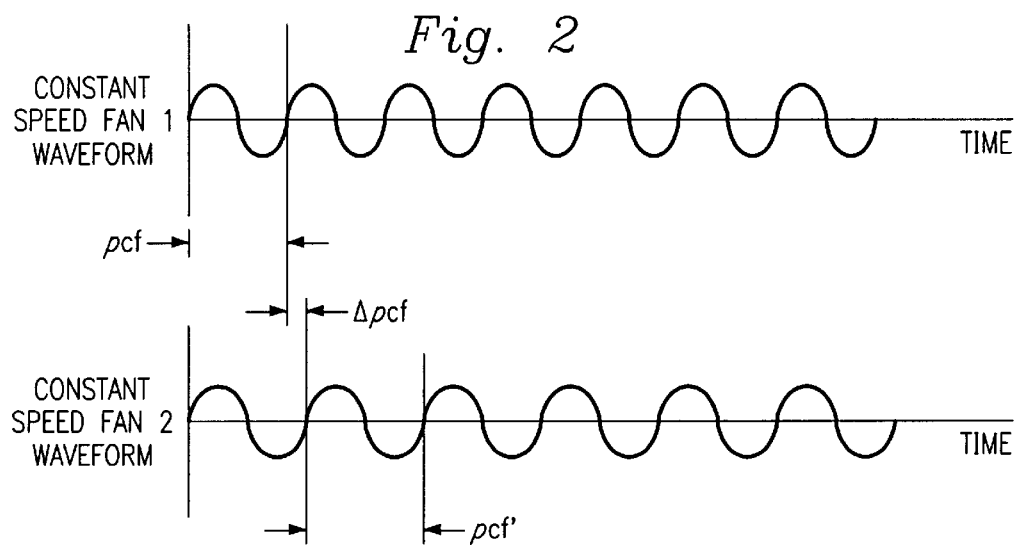
FIG. 2 is a graphical diagram showing the waveforms for the fans shown in FIG. 1.
Figure 3:
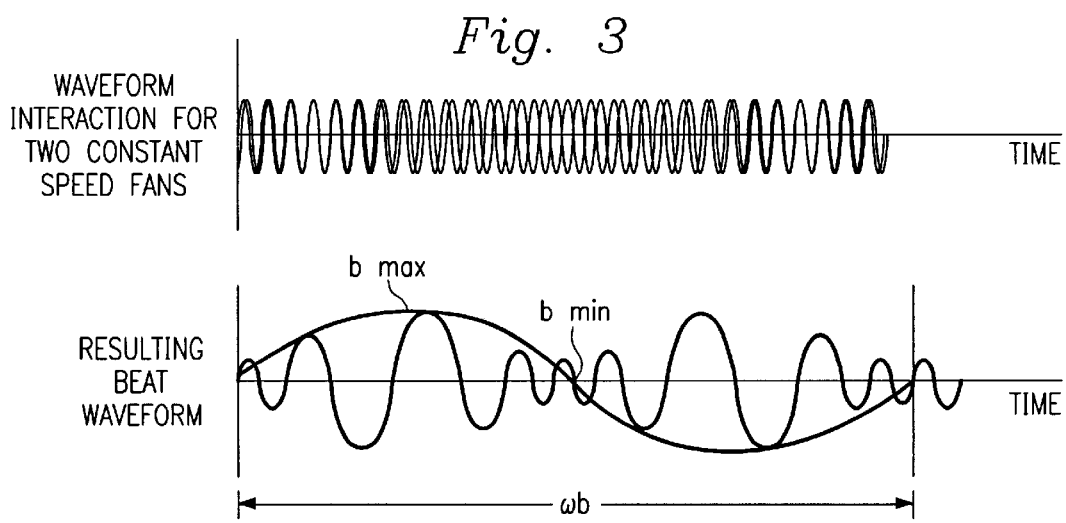
FIG. 3 is a graphical diagram showing the beat characteristics for the waveforms of the multiple fan system shown in FIG. 1.

Referring to FIGS. 1 thru 3, the constant speed fan 4 has a first period pef and the secondary constant speed fan 4' has a second period pef' that is slightly different than first period pef. The period differential $\Delta$pcf between the two constant speed fans results in the two waveforms interacting with each other to produce 'beats' at a given beat period pbcf. The beats are acoustic noises caused by the amplitudes of the two waveforms interacting. When the two waveforms are in phase, their peak amplitudes combine and the beat has its greatest amplitude bmax. Similarly, at the point where the two waveforms are 180 degrees out of phase, their peak amplitudes interfere with each other and the beat has its lowest amplitude bmin.

Multiple fan systems according to this disclosure may have two fans or more than two fans. However, not more than one of the fans may be operated at a constant speed and all of the remaining fans must be operated at different oscillating speeds In some instances, it may be preferred to operate all of the fans at oscillating speeds, providing each of the fans is operated at a different oscillating speed.

It is typical for fans in a computer system to be of a DC brushless type. These types of fans may be operated at a constant voltage or an oscillating voltage. When operated at a constant voltage, the speed of the fan is constant. When operated at an oscillating voltage, the speed of the fan will oscillate in response to the voltage oscillation. In some multiple fan systems, it will be preferred to use an AC type fan as opposed to a DC type fan.

Figure 4:
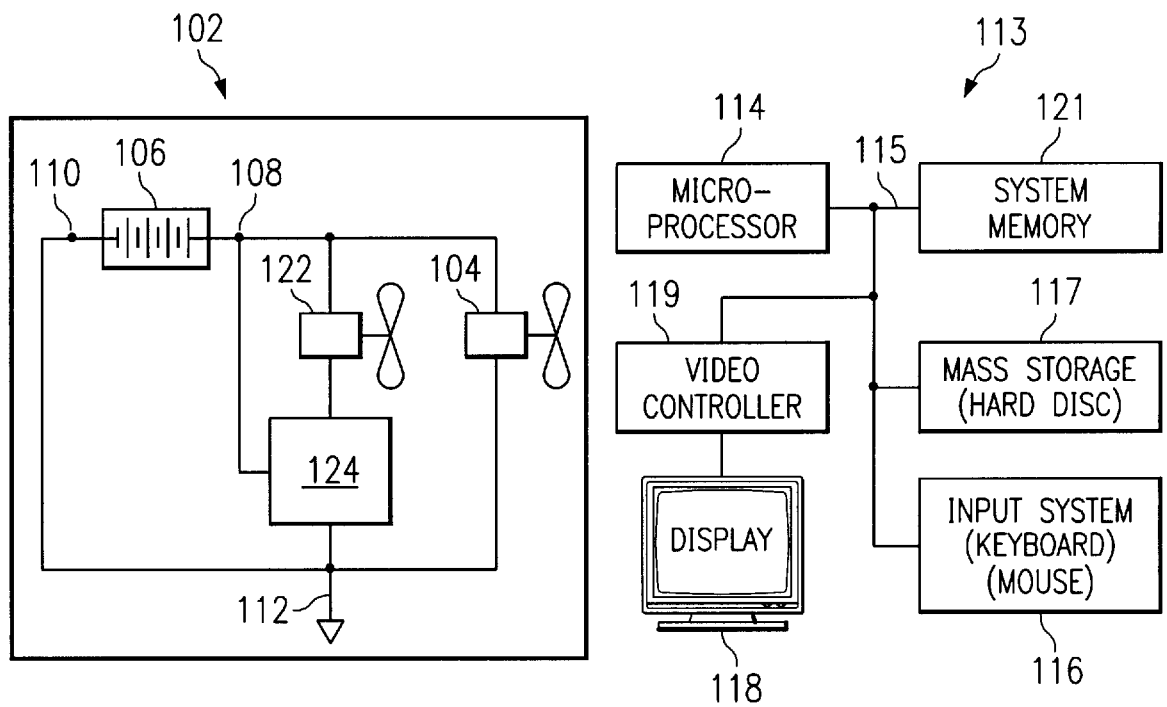
FIG. 4 is a conceptual diagram showing an illustrative embodiment of a chassis having a computer system and a multiple fan system mounted therein.

FIG. 4 shows an illustrative embodiment of a multiple fan system 102 and a computer system 113 mounted in a chassis 101. The multiple fan system 102 is used for ventilating heated air from the confines of the chassis 101. The computer system 113 includes a microprocessor 114 which is connected to a bus 115. The bus 115 serves as a connection between the microprocessor 114 and other applicable components of the computer system 113. An input system 116 is coupled to the microprocessor 114 to provide input to the microprocessor 114. Examples of input devices include keyboards, touchscreens, and pointing devices such as mouses, trackballs, and trackpads. Programs and data are stored on a mass storage device 117 which is coupled to the microprocessor 114. Mass storage devices include such devices as hard disks, optical disks, magneto-optical drives, floppy drives, and the like. The computer system 114 further includes a display 118 which is coupled to the microprocessor 114 by a video controller 119. The system memory 121 provides the microprocessor 114 with fast storage to facilitate execution of computer programs by the microprocessor 114. It should be understood that other busses and intermediate circuits can be employed between the components described above and microprocessor 114 to facilitate interconnection between the components and the microprocessor 114.

The multiple fan system 102 includes a constant speed fan 104 and an oscillating speed fan 122. Both fans are connected to the positive terminal 108 of a DC power source 106. The constant speed fan 104 is also connected to a ground location 112 that is coupled to the ground terminal 110 of the power source 106. The oscillating speed is controlled by a fan controller 124 coupled between the oscillating speed fan 122 and the ground location 112. The fan controller 124 enables oscillating speed fan operation by varying the voltage across the oscillating speed fan 122.

In the multiple fan system 102 of FIG. 4, the oscillating speed fan 122 is operated over a specified range of speed and the constant speed fan 104 is operated at a specified fixed speed. For example, the fan controller 124 may be designed to produce a duty cycle between 95% and 100% for varying the voltage across the oscillating speed fan 122. A duty cycle in this range will result in the oscillating speed fan 122 operating between 950 RPM and 1000 RPM. Because the constant speed fan 104 is subjected to a fixed voltage, it will operate at a constant speed of 1000 RPM. Thus, with one fan operating at a fixed voltage and the other operating based on a duty cycle oscillating between 95% and 100%, the primary frequency interaction of the fan waveforms would vary between 0 and 50 RPM.

Figure 5:
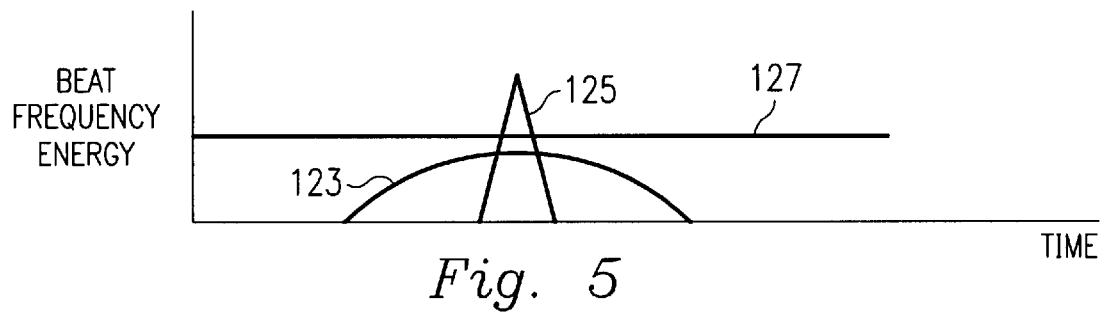
FIG. 5 is a graphical diagram showing the characteristics of dispersed beat energy according to an illustrative embodiment.

As shown in FIG. 5, multiple fan systems according to the illustrative embodiments presented herein produce an oscillating speed beat energy 123 that is dispersed over a greater period of time than is the constant speed beat energy 125. With adequate tuning, a multiple fan system will have a dispersed beat energy 123 with a peak amplitude that is maintained below a desired acoustic energy level 127.

Figure 6A:
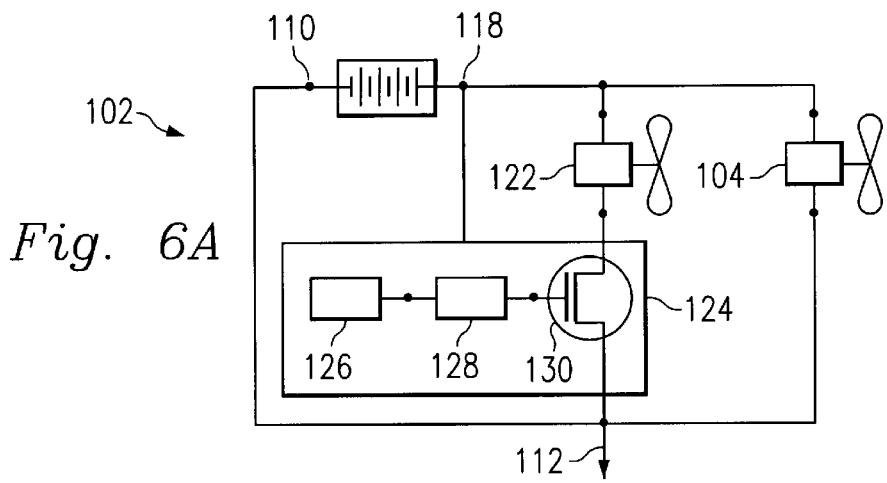
FIG. 6A is a conceptual illustration showing an illustrative embodiment of a fan controller

As shown in FIG. 6A, the fan controller 124 includes a waveform generating portion 126 coupled to a duty-cycle modulator portion 128. The duty-cycle modulator portion 128 is coupled to a voltage relay device 130. A MOSFET-type transistor has been found to be a suitable voltage relay device 130. The oscillating speed fan 122 is coupled to the ground location 112 through the voltage relay device 130.

Figure 6B:
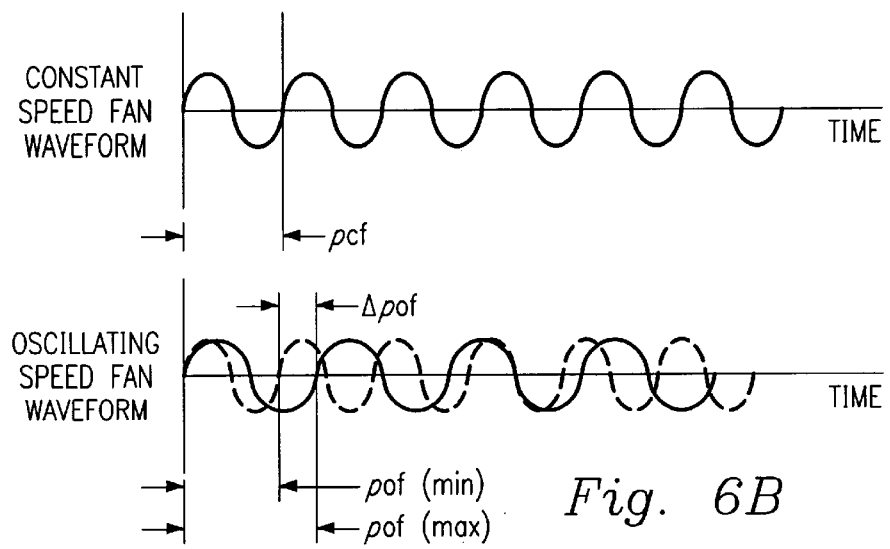
FIG. 6B is a graphical diagram showing the waveforms for the fan system shown in FIG. 6A FIG. 7 are graphical diagrams showing the input and output parameters for the fan controller shown in FIG. 6A.

FIG. 6B shows the frequencies associated with the speed of the constant speed fan 104 and the oscillating speed fan 122. The constant speed fan 104 has a constant speed period pef. The oscillating speed fan 122 has a maximum period pof (max) and a minimum period pof (min). The speed range of the oscillating speed fan is determined by the speed period differential $\Delta$pof.

Figure 7A:
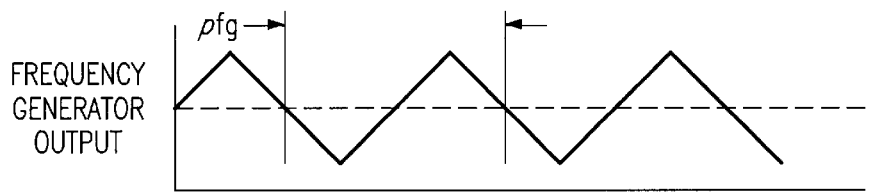
Figure 7B:
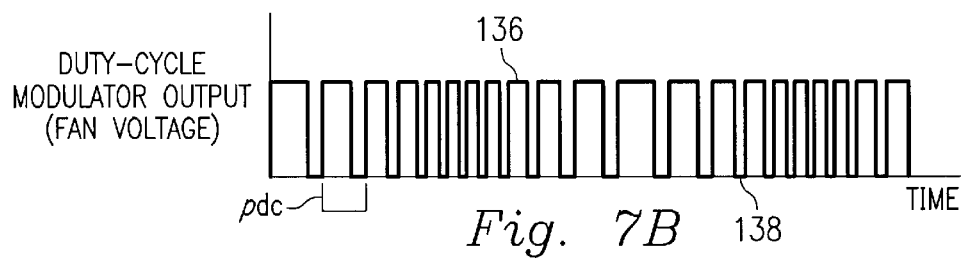
Figure 7C:
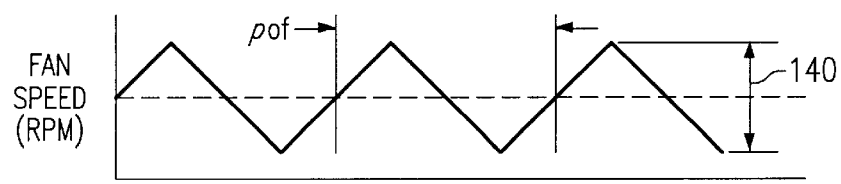

Referring to FIGS. 7A to 7C, the waveform generating portion 126 provides the duty-cycle modulator portion 128, see also FIG. 6A, with a waveform signal having a specified waveform period pfg. The duty-cycle modulator portion 126 uses the waveform signal generated by the waveform generating portion 126 to produce a voltage output having a varying duty-cycle. The duty-cycle varies due to an on-time portion 136 and off-time portion 138 varying (FIG. 7B). The amplitude of the waveform signal from the waveform generating portion 126 determines the duty-cycle period pdc. Hence, it is desirable to have a waveform period pfg that is much longer than the duty-cycle period pdc. This provides an output voltage that allows the fan speed to oscillate relatively smoothly. Accordingly, the fan controller 124 will provide an oscillating fan speed profile as shown FIG. 7C having an oscillating speed range 140. The oscillating speed fan period pof will be approximately the same as the waveform period pfg.

Figure 8:
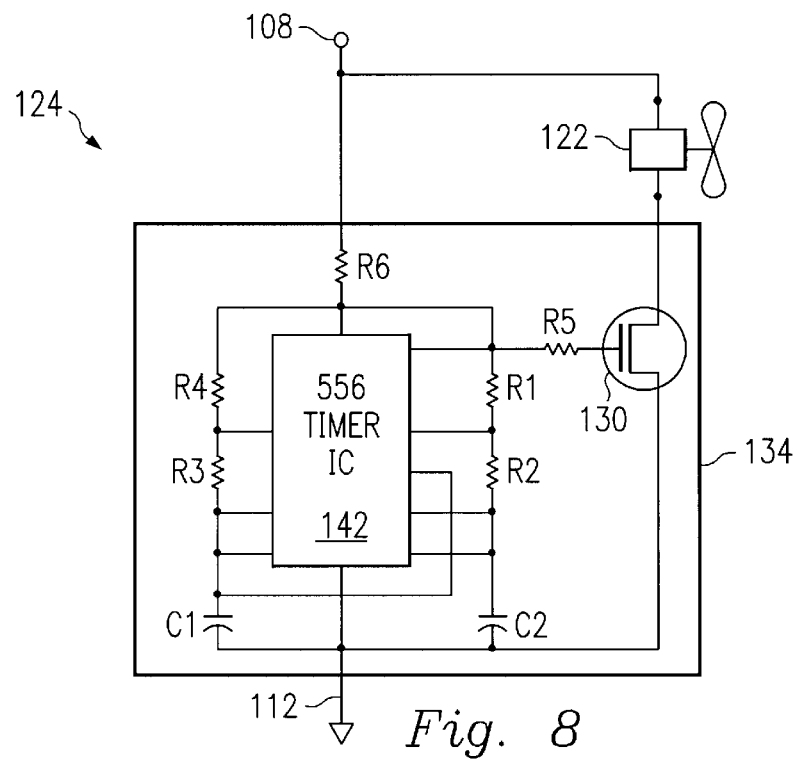
FIG. 8 is an electrical schematic for the fan controller shown in FIG. 6A.

Referring to FIG. 8, the fan controller 124 including a 556 timer circuit is shown. The 556 timer 142 is included in a circuit assembly 134 along with the MOSFET-type transistor 130, a plurality of resistors R1–R6, and a plurality of capacitors C1–C2. The circuit assembly 134 provides the waveform generating portion 126 and duty-cycle modulation portion 128, see FIG. 6A, of the fan controller 124.

Figure 9:
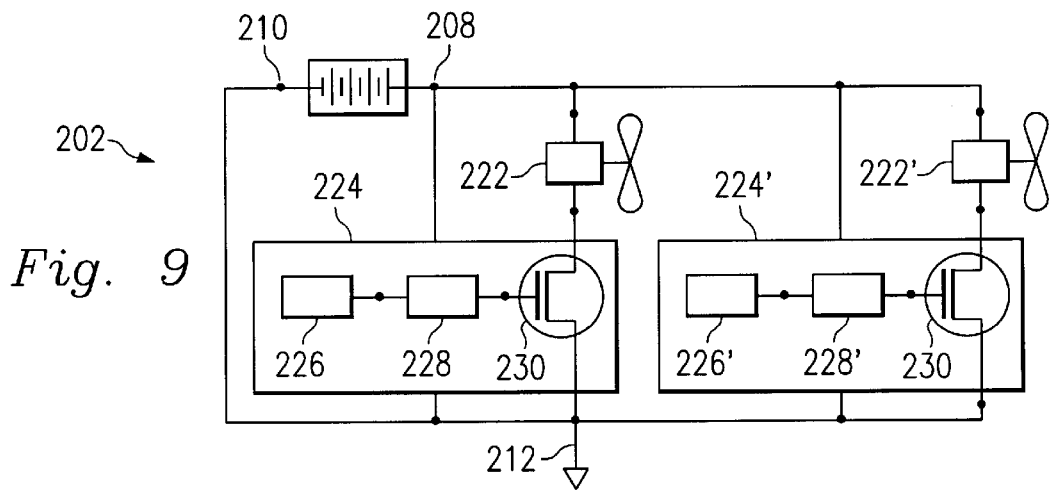
FIG. 9 is a conceptual illustration showing an illustrative embodiment of a multiple fan system having a plurality of oscillating speed fans.

The multiple fan system 202 shown in FIG. 9 includes two oscillating speed fans 222, 222' and two fan controllers 224, 224'. Similar systems having more than two oscillating speed fans as well as possibly one constant speed fan are contemplated. The key requirement for a multiple fan system having more than one oscillating speed fan is that each of the oscillating speed fans must be operated within a different range of speed.

Although the fan controllers 224, 224' as shown in FIG. 9 are separate devices, they could be integrated into a single controller with outputs for controlling two or more oscillating speed fans at different speed ranges. It is also contemplated that multiple sets of controller components could be provided on a common PCB or a plurality of individual controllers could be used in multiple fan systems according to the illustrative embodiments.

In operation, the embodiments disclosed herein operate one or more fans in a multiple fan system at oscillating speeds. For systems with two or more oscillating speed fans, it is essential that the speed range for each oscillating speed fan is different. Oscillating speed operation can be accomplished by a number of techniques. One of the preferred techniques is with a fan controller that provides a continuously varying voltage to each fan that is being operated as an oscillating speed fan.

As a result, one embodiment provides a multi-fan system including at least two simultaneously operated fans. Each of the fans is operable as a constant speed fan and as an oscillating speed fan. Not more than one of the fans is operated as a constant speed fan. Each fan not being operated as a constant speed fan is operated as an oscillating speed fan. A fan controller operates each oscillating speed fan within a different range of speed from each other oscillating speed fan.

Another embodiment provides a multi-fan system including at least two simultaneously operated fans. Each of the fans are operable as a constant speed fan and as an oscillating speed fan. Not more than one of the fans is operated as a constant speed fan. Each fan not being operated as a constant speed fan is operated as an oscillating speed fan. A fan controller operates each oscillating speed fan in a mode whereby a respective acoustic emission having a range of frequency different than any other oscillating speed fan is produced.

Still another embodiment provides a multi-fan system including at least two simultaneously operated oscillating speed fans and a fan controller operating each of the oscillating speed fans within a different range of speed from each other oscillating speed fan.

A further embodiment provides a multi-fan system including a constant speed fan, at least one oscillating speed fan operated simultaneously with the constant speed fan, and a fan controller for operating each oscillating speed fan within a different range of speed from each other oscillating speed fan.

A yet further embodiment provides a computer system including a microprocessor; an input coupled to provide input to the microprocessor; a mass storage coupled to the microprocessor; a display coupled to the microprocessor by video controller; a memory coupled to provide storage to facilitate execution of computer programs by the microprocessor; and a multi-fan ventilating system. The multiple fan system includes at least two simultaneously operated fans. Each of the fans is operable as a constant speed fan and as an oscillating speed fan. Not more than one of the fans is operated as a constant speed fan. Each fan not being operated as a constant speed fan is operated as an oscillating speed fan. A fan controller operates each oscillating speed fan within a different range of speed from each other oscillating speed fan.

Yet still another embodiment provides a method for dispersing beat frequencies in a multi-fan system. The method includes the steps of providing at least two fans; operating not more than one of the fans as a constant speed fan, each fan not being operated as a constant speed fan is operated as an oscillating speed fan; and operating each of the oscillating speed fans with a fan controller adapted to control each oscillating speed fans within a different range of speed from each other oscillating speed fan.

As it can be seen, the principal advantages of these embodiments are that the beat energy can be dispersed over a longer period and a cost-effective multiple fan system can be provided for cost sensitive applications. A multiple fan system according to the embodiments disclosed herein enables the dispersed beat energy to have a peak amplitude that is maintained below a desired acoustic energy level. This is a key benefit for providing a multiple fan system for use in devices such as computers used in enclosed areas.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system in combination with a multiple fan system, comprising:

a microprocessor mounted in a chassis;

an input coupled to provide input to the microprocessor;

a mass storage coupled to the microprocessor;

a video controller coupled to the microprocessor;

a memory coupled to provide storage to facilitate execution of computer programs by the microprocessor; and a multiple fan ventilating system mounted in the chassis, the multiple fan system including:

at least two simultaneously operated fans, each fan being capable of operating as a constant speed fan or as an oscillating speed fan, one of the fans always being operated as a constant speed fan, and simultaneously, each other fan always being operated as an oscillating speed fan; and a fan controller capable of controlling a plurality of fans, the fan controller operating each of the oscillating speed fans within a different range of speed from each other oscillating speed fan, the controller providing an output voltage having a varying duty cycle and providing an oscillating fan speed profile having an oscillating speed range.

2. The computer system of claim 1 wherein the fan controller includes a waveform generating portion coupled to a duty-cycle modulator portion.

3. The computer system of claim 1 wherein each of the fans is electrically operated by a DC voltage and the fan controller varies the DC voltage provided to the oscillating speed fans.

4. The computer system of claim 1 wherein each of the fans is electrically operated by a DC voltage and the fan controller utilizes a continuously varying duty-cycle for varying the DC voltage provided to the oscillating speed fans.

5. The computer system of claim 1 wherein each of the fans is electrically operated by a DC voltage and the fan controller includes a wave generator and a duty-cycle modulator for varying the DC voltage.

6. The computer system of claim 1 wherein the multiple fan system includes two oscillating speed fans and wherein the fan controller operates the first fan within a first range of speed and the second fan within a second range of speed.

7. The computer system of claim 2 wherein the duty cycle modulator portion is coupled to a voltage relay device.

\* \* \* \* \*